(12) United States Patent
Yu et al.

(10) Patent No.: US 11,016,606 B1
(45) Date of Patent: May 25, 2021

(54) METHOD AND DEVICE FOR CONTROLLING TOUCH SCREEN, AND ELECTRONIC DEVICE

(71) Applicants: Fuzhou BOE Optoelectronics Technology Co., Ltd., Fuzhou (CN); BOE TECHNOLOGY GROUP CO., LTD., Beijing (CN)

(72) Inventors: Renhui Yu, Beijing (CN); Hongzhou Xie, Beijing (CN); Ye Hu, Beijing (CN); Shangtao Zheng, Beijing (CN); Wen Zha, Beijing (CN); Xin Chen, Beijing (CN); Meizhen Chen, Beijing (CN); Qingna Hou, Beijing (CN); Kai Diao, Beijing (CN)

(73) Assignees: FUZHOU BOE OPTOELECTRONICS TECHNOLOGY CO., LTD., Fuzhou (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/830,564

(22) Filed: Mar. 26, 2020

(30) Foreign Application Priority Data

Nov. 1, 2019 (CN) .......................... 201911061193.0

(51) Int. Cl.
G06F 3/041 (2006.01)
G06F 3/045 (2006.01)
G06F 3/046 (2006.01)
G06F 3/044 (2006.01)

(52) U.S. Cl.
CPC ............ *G06F 3/0418* (2013.01); *G06F 3/045* (2013.01); *G06F 3/046* (2013.01); *G06F 3/0444* (2019.05)

(58) Field of Classification Search
None
See application file for complete search history.

(56) References Cited

U.S. PATENT DOCUMENTS

2019/0339313 A1* 11/2019 Vandermeijden ..... G06F 3/0412

* cited by examiner

*Primary Examiner* — Aneeta Yodichkas
(74) *Attorney, Agent, or Firm* — Westman, Champlin & Koehler, P.A.

(57) ABSTRACT

The present disclosure provides a method and device for controlling a touch screen, and an electronic device. The method includes: applying a first driving voltage to a voltage input terminal of the bridge, and obtaining a first voltage difference between a first voltage output terminal and a second voltage output terminal of the bridge corresponding to the first driving voltage; determining a first equivalent resistance value of the bridge corresponding to the first driving voltage at a current temperature according to the first driving voltage and a preset equation; determining a first compensation voltage value corresponding to the current temperature according to the first equivalent resistance value, the first voltage difference, and a preset formula; determining whether to trigger a touch unit corresponding to the bridge according to the first voltage difference and the first compensation voltage value.

10 Claims, 6 Drawing Sheets

METHOD AND DEVICE FOR CONTROLLING TOUCH SCREEN, AND ELECTRONIC DEVICE

CROSS-REFERENCE TO RELATED APPLICATION(S)

The present disclosure claims priority to Chinese Patent Application No. 201911061193.0 filed on Nov. 1, 2019 and titled "Method and device for controlling touch screen, and electronic device", the entire disclosure of which is incorporated herein by reference.

TECHNICAL FIELD

The present disclosure relates to the technical field of electronic devices, and in particular, to a method for controlling a touch screen, a device for controlling a touch screen, and an electronic device.

BACKGROUND

At present, the market's functional requirements for display screens are not only data display, but human-computer interaction. Therefore, the touch function of the display screen is essential.

Conventional touch screens for display screens usually use indium tin oxide (ITO) material as the material of the touch unit. The indium tin oxide material has a resistance temperature change characteristic, that is, when the ambient temperature changes or the touch unit itself generates heat and the temperature changes, the resistance of the indium tin oxide material changes accordingly. Therefore, for the same driving voltage, the touch unit will output different voltage signals at different temperatures. If the touch unit outputs the wrong voltage signal, it may cause the control chip of the touch screen to mistakenly judge that the output voltage signal of the touch unit is changed by the user's touch, and the corresponding reporting point response is performed incorrectly, degrading the user's experience.

SUMMARY

In a first aspect, an embodiment of the present disclosure provides a method for controlling a touch screen, the touch screen comprises a plurality of touch units, and each of the touch units comprises a bridge formed by a plurality of touch sub-units connected in series, and the method for controlling the touch screen including: applying a first driving voltage to a voltage input terminal of the bridge, and obtaining a first voltage difference between a first voltage output terminal and a second voltage output terminal of the bridge corresponding to the first driving voltage; determining a first equivalent resistance value of the bridge corresponding to the first driving voltage at a current temperature according to the first driving voltage and a preset equation; determining a first compensation voltage value corresponding to the current temperature according to the first equivalent resistance value, the first voltage difference, and a preset formula; and determining whether to trigger a touch unit corresponding to the bridge according to the first voltage difference and the first compensation voltage value.

In an embodiment, the determining whether to trigger a touch unit corresponding to the bridge according to the first voltage difference and the first compensation voltage value includes: obtaining a voltage sum of the first voltage difference and the first compensation voltage value; determining not to trigger the touch unit corresponding to the bridge if the voltage sum is less than a preset voltage value; and determining to trigger the touch unit corresponding to the bridge if the voltage sum is greater than or equal to the preset voltage value.

In an embodiment, the preset equation comprises a first equality and a second equality. A left side of the first equality is related to a ratio formed by the first driving voltage, a second driving voltage, the first equivalent resistance value, and a second equivalent resistance value of the bridge corresponding to the second driving voltage at the current temperature, and a right side of the first equality is related to a ratio formed by the first driving voltage, the second driving voltage, a first constant, and a second constant. A left side of the second equality is related to a ratio formed by the first driving voltage, the first constant, and the first equivalent resistance value, and a right side of the second equality is related to a ratio formed by the second driving voltage, the second constant, and the second equivalent resistance value.

In an embodiment, the preset equation is the following equations:

$$(V2*M2 - V1*M1)/(V1*M1) = (V2*M4 - V1*M3)/(V1*M3); \text{ and}$$

$$(V1*M3 - V1*M1)/(V1*M1) = (V2*M4 - V2*M2)/(V2*M2)$$

wherein V1 is the first driving voltage, V2 is the second driving voltage, M1 is the first equivalent resistance value, M2 is the second equivalent resistance value, M3 is the first constant, and M4 is the second constant.

In an embodiment, the preset formula is related to the first compensation voltage value, the first voltage difference, and a product of the first equivalent resistance value and the first voltage difference.

In an embodiment, the preset formula is:

$$\lambda = M1*\Delta V1 - \Delta V1$$

wherein $\lambda$ is the first compensation voltage value, M1 is the first equivalent resistance value, and $\Delta V1$ is the first voltage difference.

In a second aspect, an embodiment of the present disclosure further provides a device for controlling a touch screen, wherein the touch screen comprises a plurality of touch units, and each of the touch units comprises a bridge formed by a plurality of touch sub-units connected in series, and the device for controlling the touch screen includes: a first voltage difference obtaining module configured to obtain a first voltage difference between a first voltage output terminal and a second voltage output terminal of the bridge corresponding to a first driving voltage, when the first driving voltage is applied to a voltage input terminal of the bridge; a first equivalent resistance value determining module configured to determine a first equivalent resistance value of the bridge corresponding to the first driving voltage at a current temperature according to the first driving voltage and a preset equation; a first compensation voltage value determining module configured to determine a first compensation voltage value corresponding to the current temperature according to the first equivalent resistance value, the first voltage difference, and a preset formula; and a first trigger determining module configured to determine whether to trigger a touch unit corresponding to the bridge according to the first voltage difference and the first compensation voltage value.

In a third aspect, an embodiment of the present disclosure further provides an electronic device including a memory, a processor, and a computer program stored on the memory and operable on the processor, wherein the computer program, when executed by the processor, implements steps of the method for controlling a touch screen as previously described in the first aspect.

In a fourth aspect, an embodiment of the present disclosure further provides a computer-readable storage medium having stored thereon a computer program that, when executed by a processor, implements steps of the method for controlling a touch screen as previously described.

The above description is only an overview of the technical solutions of the present disclosure. In order to understand the technical means of the present disclosure more clearly so that it can be implemented in accordance with the content of the specification, and in order to make the above and other objects, features, and advantages of the present disclosure more comprehensible, specific implementations of the present disclosure are given below.

BRIEF DESCRIPTION OF THE DRAWINGS

In order to more clearly illustrate the technical solutions of the embodiments of the present disclosure, the drawings that are used in the description of the embodiments of the present disclosure will be briefly introduced below. Obviously, the drawings in the following description are only some embodiments of the present disclosure. For those of ordinary skill in the art, other drawings may be obtained according to these drawings without paying creative effort.

DETAILED DESCRIPTION

The technical solutions in the embodiments of the present disclosure will be clearly and completely described below with reference to the accompanying drawings in the embodiments of the present disclosure. Obviously, the described embodiments are part of the embodiments of the present disclosure, but not all of the embodiments. All other embodiments obtained by those skilled in the art based on the embodiments of the present disclosure without creative work should fall within the protection scope of the present disclosure.

A method for controlling a touch screen provided by an embodiment of the present disclosure is described in detail.

The touch screen of the embodiment of the present disclosure may include a plurality of touch units, and each touch unit includes a bridge (such as a Wheatstone bridge) formed by a plurality of touch sub-units connected in series.

Figure 1:
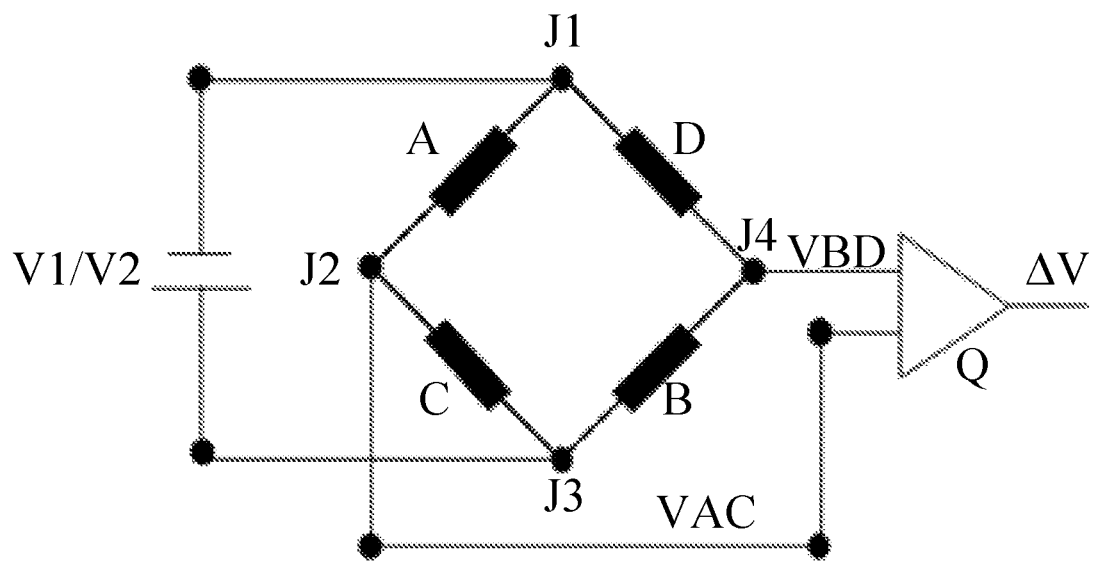
FIG. 1 is a schematic structural diagram of a bridge in an embodiment of the present disclosure.

For example, referring to FIG. 1, the bridge may be a Wheatstone bridge formed by four touch sub-units (a first touch sub-unit A, a second touch sub-unit B, a third touch sub-unit C, and a fourth touch sub-unit D) connected in series. The touch sub-units in this Wheatstone bridge satisfy the following relationship, RA*RB=RC*RD. RA is the resistance value of the first touch sub-unit A, RB is the resistance value of the second touch sub-unit B, RC is the resistance value of the third touch sub-unit C, and RD is the resistance value of the fourth touch sub-unit D. The node between the first touch sub-unit A and the fourth touch sub-unit D is referred to as first node J1. The node between the first touch sub-unit A and the third touch sub-unit C is referred to as second node J2. The node between the third touch sub-unit C and the second touch sub-unit B is referred to as third node J3. The node between the second touch sub-unit B and the fourth touch sub-unit D is referred to as fourth node J4. The first node J1 and the third node J3 are used as the voltage input terminals of the bridge, the second node J2 is used as a first voltage output terminal of the bridge, and the fourth node J4 is used as a second voltage output terminal of the bridge.

Figure 2:
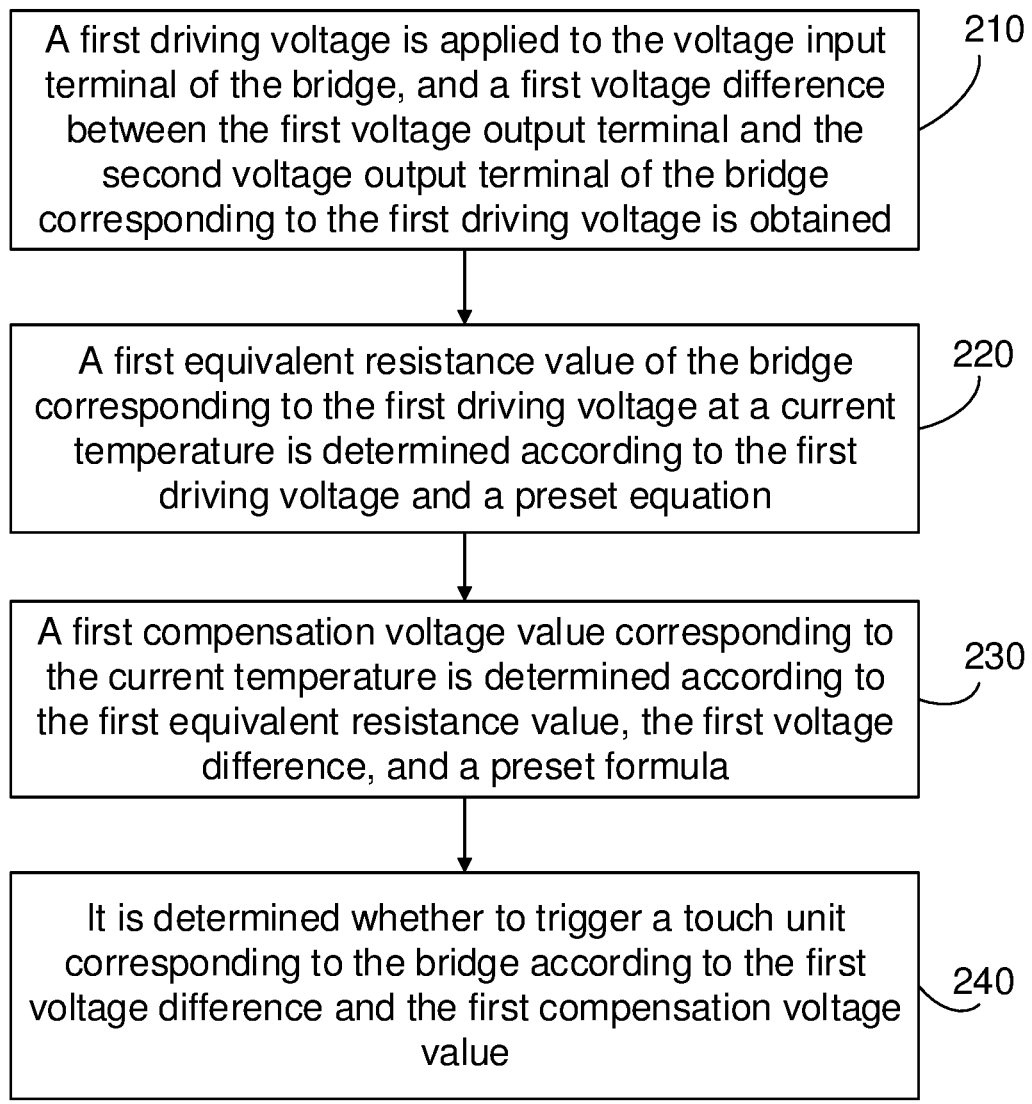
FIG. 2 is a flowchart of steps in a method for controlling a touch screen according to an embodiment of the present disclosure.

Referring to FIG. 2, a flowchart of steps of a method for controlling a touch screen according to an embodiment of the present disclosure is shown.

In step 210, a first driving voltage is applied to the voltage input terminal of the bridge, and a first voltage difference between the first voltage output terminal and the second voltage output terminal of the bridge corresponding to the first driving voltage is obtained.

Specifically, when the touch screen is operating, the scan signal of the touch screen may include a first driving voltage and a second driving voltage.

Optionally, in step 210, after obtaining a voltage value of the first voltage output terminal of the bridge corresponding to the first driving voltage and a voltage value of the second voltage output terminal of the bridge corresponding to the first driving voltage, the voltage value of the first voltage output terminal is subtracted from the voltage value of the second voltage output terminal to obtain the first voltage difference.

Optionally, as shown in FIG. 1, the first voltage output terminal of the bridge may be connected to a first input terminal of a subtractor Q, and the second voltage output terminal of the bridge may be connected to a second input terminal of the subtractor Q. In this way, in step 110, the first voltage difference may be obtained by obtaining a voltage value at the output terminal of the subtractor Q.

In step 220, a first equivalent resistance value of the bridge corresponding to the first driving voltage at a current temperature is determined according to the first driving voltage and a preset equation.

If the bridge is the Wheatstone bridge shown in FIG. 1, the first equivalent resistance value is (RA*RB−RC*RD)/(RA+RC)*(RB+RD) corresponding to the first driving voltage at the current temperature.

In step 230, a first compensation voltage value corresponding to the current temperature is determined according to the first equivalent resistance value, the first voltage difference, and a preset formula.

Assuming that the voltage difference between the first voltage output terminal and the second voltage output terminal of the bridge corresponding to the first driving voltage at the reference temperature does not need to be compensated, the first compensation voltage value is the deviation of the voltage difference between the first voltage output terminal and the second voltage output terminal of the bridge due to the temperature change of the current temperature relative to the reference temperature.

In step 240, it is determined whether to trigger a touch unit corresponding to the bridge according to the first voltage difference and the first compensation voltage value.

In step 240 of determining whether to trigger the touch unit corresponding to the bridge, it is not determined only according to the first voltage difference between the first voltage output terminal and the second voltage output terminal of the bridge after the temperature changes, instead, it is determined according to the first voltage difference and also the first compensation voltage value which is related to the current temperature. Therefore, the effect of temperature change on the judgment result of the control chip of the touch screen can be eliminated, and the occurrence of false reporting points of the touch screen can be effectively avoided, which greatly improves the user experience using the touch screen.

In the embodiment of the present disclosure, the touch screen includes a plurality of touch units, and each touch unit includes a bridge formed by a plurality of touch sub-units connected in series. A first driving voltage is applied to a voltage input terminal of the bridge, and a first voltage difference between a first voltage output terminal and a second voltage output terminal of the bridge corresponding to the first driving voltage is obtained; a first equivalent resistance value of the bridge corresponding to the first driving voltage at a current temperature is determined according to the first driving voltage and a preset equation; a first compensation voltage value corresponding to the current temperature is determined according to the first equivalent resistance value, the first voltage difference, and a preset formula; it is determined whether to trigger a touch unit corresponding to the bridge according to the first voltage difference and the first compensation voltage value. Therefore, the first voltage difference can be compensated according to the current temperature, and whether to trigger the touch unit corresponding to the bridge is determined according to the compensated voltage difference. Therefore, the effect of temperature change on the judgment result of the control chip of the touch screen can be eliminated, and the occurrence of false reporting points of the touch screen can be effectively avoided, which greatly improves the user experience using the touch screen.

A method for controlling a touch screen provided by another embodiment of the present disclosure is described in detail.

The touch screen of the embodiment of the present disclosure includes a plurality of touch units, and each touch unit includes a bridge (such as a Wheatstone bridge) formed by a plurality of touch sub-units connected in series.

For example, referring to FIG. 1, the bridge may be a Wheatstone bridge formed by four touch sub-units (a first touch sub-unit A, a second touch sub-unit B, a third touch sub-unit C, and a fourth touch sub-unit D) connected in series. The touch sub-units in this Wheatstone bridge satisfy the following relationship, RA*RB=RC*RD. RA is the resistance value of the first touch sub-unit A, RB is the resistance value of the second touch sub-unit B, RC is the resistance value of the third touch sub-unit C, and RD is the resistance value of the fourth touch sub-unit D. The node between the first touch sub-unit A and the fourth touch sub-unit D is referred to as first node J1. The node between the first touch sub-unit A and the third touch sub-unit C is referred to as second node J2. The node between the third touch sub-unit C and the second touch sub-unit B is referred to as third node J3. The node between the second touch sub-unit B and the fourth touch sub-unit D is referred to as fourth node J4. The current between the second node J2 and the fourth node J4 is zero. The first node J1 and the third node J3 are used as the voltage input terminals of the bridge, the second node J2 is used as a first voltage output terminal of the bridge, and the fourth node J4 is used as a second voltage output terminal of the bridge.

Optionally, each arm of the bridge may be the same. For example, for the bridge of FIG. 1, the first touch sub-unit A, the second touch sub-unit B, the third touch sub-unit C, and the fourth touch sub-unit D are the same.

Figure 3:
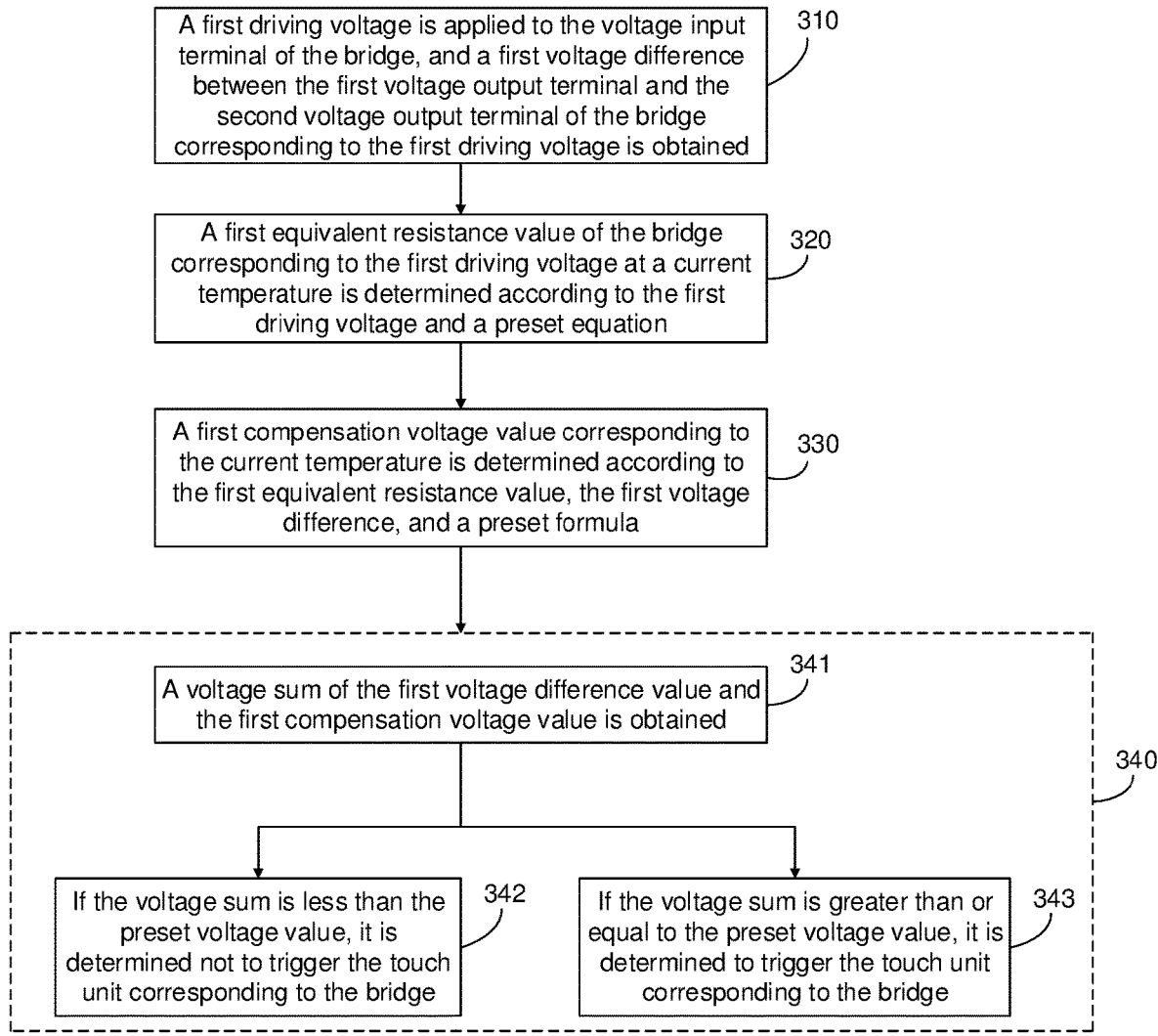
FIG. 3 is a flowchart of steps in a method for controlling a touch screen according to another embodiment of the present disclosure.

Referring to FIG. 3, a flowchart of steps of a method for controlling a touch screen according to another embodiment of the present disclosure is shown.

In step 310, a first driving voltage is applied to the voltage input terminal of the bridge, and a first voltage difference between the first voltage output terminal and the second voltage output terminal of the bridge corresponding to the first driving voltage is obtained.

Specifically, when the touch screen is operating, the scan signal of the touch screen may include the first driving voltage and a second driving voltage.

Optionally, in step 310, after obtaining a voltage value of the first voltage output terminal of the bridge corresponding to the first driving voltage and a voltage value of the second voltage output terminal of the bridge corresponding to the first driving voltage, the voltage value of the first voltage output terminal is subtracted from the voltage value of the second voltage output terminal to obtain the first voltage difference.

Optionally, as shown in FIG. 1, the first voltage output terminal of the bridge may be connected to a first input terminal of a subtractor Q, and the second voltage output terminal of the bridge may be connected to a second input terminal of the subtractor Q. In this way, in step 310, the first voltage difference may be obtained by obtaining a voltage value at the output terminal of the subtractor Q.

In step 320, a first equivalent resistance value of the bridge corresponding to the first driving voltage at a current temperature is determined according to the first driving voltage and a preset equation.

If the bridge is the Wheatstone bridge shown in FIG. 1, the equivalent resistance value corresponding to the driving voltage at the current temperature is (RA*RB−RC*RD)/(RA+RC)*(RB+RD).

Optionally, the preset equation may include a first equality and a second equality. A left side of the first equality is related to a ratio formed by the first driving voltage, a second driving voltage, the first equivalent resistance value, and a second equivalent resistance value of the bridge corresponding to the second driving voltage at the current temperature, and a right side of the first equality is related to a ratio formed by the first driving voltage, the second driving voltage, a first constant, and a second constant. A left side of the second equality is related to a ratio formed by the first driving voltage, the first constant, and the first equivalent resistance value, and a right side of the second equality is related to a ratio formed by the second driving voltage, the second constant, and the second equivalent resistance value. The first constant may be a third equivalent resistance value of the bridge corresponding to the first driving voltage at the reference temperature, and the second constant may be a fourth equivalent resistance value of the bridge corresponding to the second driving voltage at the reference temperature.

Optionally, if the bridge is the Wheatstone bridge of FIG. 1,
when the temperature is a first temperature T1 and the driving voltage is the first driving voltage V1, the first equivalent resistance value of the bridge is M1, and the first voltage difference ΔV1=VAC−VBD=V1*M1;

when the temperature is the first temperature T1 and the driving voltage is the second driving voltage V2, the second equivalent resistance value of the bridge is M2, and the second voltage difference ΔV2=VAC−VBD=V2*M2;

when the temperature is a second temperature T2 and the driving voltage is the first driving voltage V1, the third equivalent resistance value of the bridge is M3, and the third voltage difference ΔV1'=VAC−VBD=V1*M3;

when the temperature is the second temperature T2 and the driving voltage is the second driving voltage V2, the fourth equivalent resistance value of the bridge is M4, and the fourth voltage difference ΔV2'=VAC−VBD=V2*M4.

It can be seen from the above that the voltage difference of the bridge is related to the temperature and the driving voltage. In this way, when the magnitude of the driving voltage is determined, the voltage difference of the bridge is only related to the equivalent resistance value of the bridge, and the equivalent resistance value of the bridge is related to the driving voltage and ambient temperature.

When the temperature is the first temperature T1, ΔV1−ΔV2=V1*M1−V2*M2.

When the temperature is the second temperature T2, ΔV1'−ΔV2'=V1*M3−V2*M4.

Define the following parameters: ρ1=(ΔV2−ΔV1)/ΔV1=(V2*M2−V1*M1)/(V1*M1);

$$\rho 2=(\Delta V2'-\Delta V1')/\Delta V1'=(V2*M4-V1*M3)/(V1*M3);$$

$$\rho 3=(\Delta V1'-\Delta V1)/\Delta V1=(V1*M3-V1*M1)/(V1*M1);$$
and $$\rho 4=(\Delta V2'-\Delta V2)/\Delta V2=(V2*M4-V2*M2)/(V2*M2);$$

Parameters ρ1 and ρ2 reflect the temperature coefficient of resistance of the bridge at the same temperature and different driving voltages, and parameters ρ3 and ρ4 reflect the temperature coefficient of resistance of the bridge at different temperatures and the same driving voltage.

Figure 4:
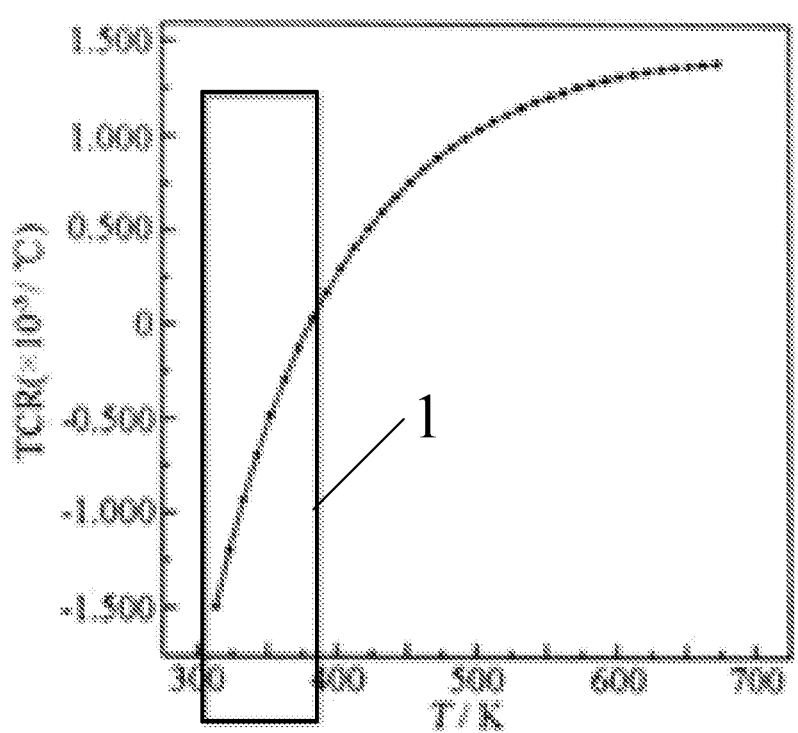
FIG. 4 is a schematic diagram of a correspondence curve of temperature and temperature coefficient of resistance of an indium tin oxide material.

According to the correspondence curve of temperature and temperature coefficient of resistance (TCR) of the indium tin oxide material in FIG. 4, in the application temperature range of the indium tin oxide material (the application temperature range shown by block 1 in FIG. 4), the temperature coefficient of resistance changes approximately linearly with temperature, so the rate of change of the voltage difference is a fixed value, and different driving voltages correspond to different operating temperatures when the bridge characteristics are taken into account. Therefore, the equations ρ1=ρ2, and ρ3=ρ4 can be obtained.

When the first temperature T1 is the reference temperature and the magnitudes of the first driving voltage V1 and the second driving voltage V2 are known, the third equivalent resistance value is a first known constant, and the fourth equivalent resistance value is a second known constant.

Optionally, when the third equivalent resistance value is a first known constant and the fourth equivalent resistance value is a second known constant, the preset equation may be the following equations:

$$(V2*M2-V1*M1)/(V1*M1)=(V2*M4-V1*M3)/(V1*M3);\text{ and}$$

$$(V1*M3-V1*M1)/(V1*M1)=(V2*M4-V2*M2)/(V2*M2)$$

V1 is the first driving voltage, V2 is the second driving voltage, M1 is the first equivalent resistance value, M2 is the second equivalent resistance value, M3 is the first constant, and M4 is the second constant.

Since only the first equivalent resistance value M1 and the second equivalent resistance value M2 are unknown in the preset equation, the first equivalent resistance value M1 and the second equivalent resistance value M2 can be determined through the preset equation.

In step 330, a first compensation voltage value corresponding to the current temperature is determined according to the first equivalent resistance value, the first voltage difference, and a preset formula.

Assuming that the voltage difference between the first voltage output terminal and the second voltage output terminal of the bridge corresponding to the first driving voltage at the reference temperature does not need to be compensated, the first compensation voltage value is the deviation of the voltage difference between the first voltage output terminal and the second voltage output terminal of the bridge due to the temperature change of the current temperature relative to the reference temperature.

Optionally, the preset formula may be related to the first compensation voltage value, the first voltage difference, and a product of the first equivalent resistance value and the first voltage difference.

Optionally, the preset formula may be:

$$\lambda =M1*\Delta V1-\Delta V1$$

where λ is the first compensation voltage value, M1 is the first equivalent resistance value, ΔV1 is the first voltage difference, and M1*ΔV1 is the offset of the voltage difference of the bridge at the current temperature.

In step 340, it is determined whether to trigger a touch unit corresponding to the bridge according to the first voltage difference and the first compensation voltage value.

In step 340 of determining whether to trigger the touch unit corresponding to the bridge, it is not determined only according to the first voltage difference between the first voltage output terminal and the second voltage output terminal of the bridge after the temperature changes, instead, it is determined according to the first voltage difference and also the first compensation voltage value which is related to the current temperature. Therefore, the effect of temperature change on the judgment result of the control chip of the touch screen can be eliminated, and the occurrence of false reporting points of the touch screen can be effectively avoided, which greatly improves the user experience using the touch screen.

Optionally, step 340 of determining whether to trigger the touch unit corresponding to the bridge according to the first voltage difference and the first compensation voltage value may include step 341, step 342 and step 343.

In step 341, a voltage sum of the first voltage difference and the first compensation voltage value is obtained.

The first compensation voltage value is used for calibrating the first voltage difference of the bridge at the current temperature. The voltage sum in step 341 is a compensated voltage value obtained after the first voltage difference is compensated and zero-calibrated by using the first compensation voltage value. The voltage sum is equivalent to the voltage difference between the first voltage output terminal and the second voltage output terminal of the bridge at the reference temperature and the first driving voltage.

In step 342, if the voltage sum is less than the preset voltage value, it is determined not to trigger the touch unit corresponding to the bridge.

Specifically, when the voltage sum is less than the preset voltage value, in step 342, it is determined that the change in the voltage difference between the first voltage output terminal and the second voltage output terminal of the bridge is not caused by the user touching the touch unit. Therefore, in step 342, it is determined not to trigger the touch unit corresponding to the bridge, so as to avoid the false reporting point of the touch screen, which greatly improves the user experience.

In step 343, if the voltage sum is greater than or equal to the preset voltage value, it is determined to trigger the touch unit corresponding to the bridge.

Specifically, when the voltage sum is greater than or equal to the preset voltage value, in step 343, it is determined that the change in the voltage difference between the first voltage output terminal and the second voltage output terminal of the bridge is caused by the user touching the touch unit. Therefore, in step 343, it is determined to trigger the touch unit corresponding to the bridge to ensure the normal reporting point function of the touch unit.

It should be noted that in the embodiment of the present disclosure, whether to trigger the touch unit corresponding to the bridge may be determined not according to the first voltage difference and the first compensation voltage value, and instead according to the second voltage difference between the first voltage output terminal and the second voltage output terminal of the bridge corresponding to the second driving voltage, and the second compensation voltage value corresponding to the current temperature. The second compensation voltage value corresponding to the current temperature is determined according to the second equivalent resistance value, the second voltage difference, and a preset formula.

In the embodiment of the present disclosure, the touch screen includes a plurality of touch units, and each touch unit includes a bridge formed by a plurality of touch sub-units connected in series. A first driving voltage is applied to a voltage input terminal of the bridge, and a first voltage difference between a first voltage output terminal and a second voltage output terminal of the bridge corresponding to the first driving voltage is obtained; a first equivalent resistance value of the bridge corresponding to the first driving voltage at a current temperature is determined according to the first driving voltage and a preset equation; a first compensation voltage value corresponding to the current temperature is determined according to the first equivalent resistance value, the first voltage difference, and a preset formula; a voltage sum of the first voltage difference and the first compensation voltage value is obtained; if the voltage sum is less than the preset voltage value, it is determined not to trigger the touch unit corresponding to the bridge; if the voltage sum is greater than or equal to the preset voltage value, it is determined to trigger the touch unit corresponding to the bridge. The first voltage difference can be compensated according to the current temperature, and whether to trigger the touch unit corresponding to the bridge is determined according to the compensated voltage difference. Therefore, the effect of temperature change on the judgment result of the control chip of the touch screen can be eliminated, and the occurrence of false reporting points of the touch screen can be effectively avoided, which greatly improves the user experience using the touch screen.

A device for controlling a touch screen provided by an embodiment of the present disclosure is described in detail.

The touch screen of the embodiment of the present disclosure may include a plurality of touch units, and each touch unit includes a bridge (such as a Wheatstone bridge) formed by a plurality of touch sub-units connected in series.

Figure 5:
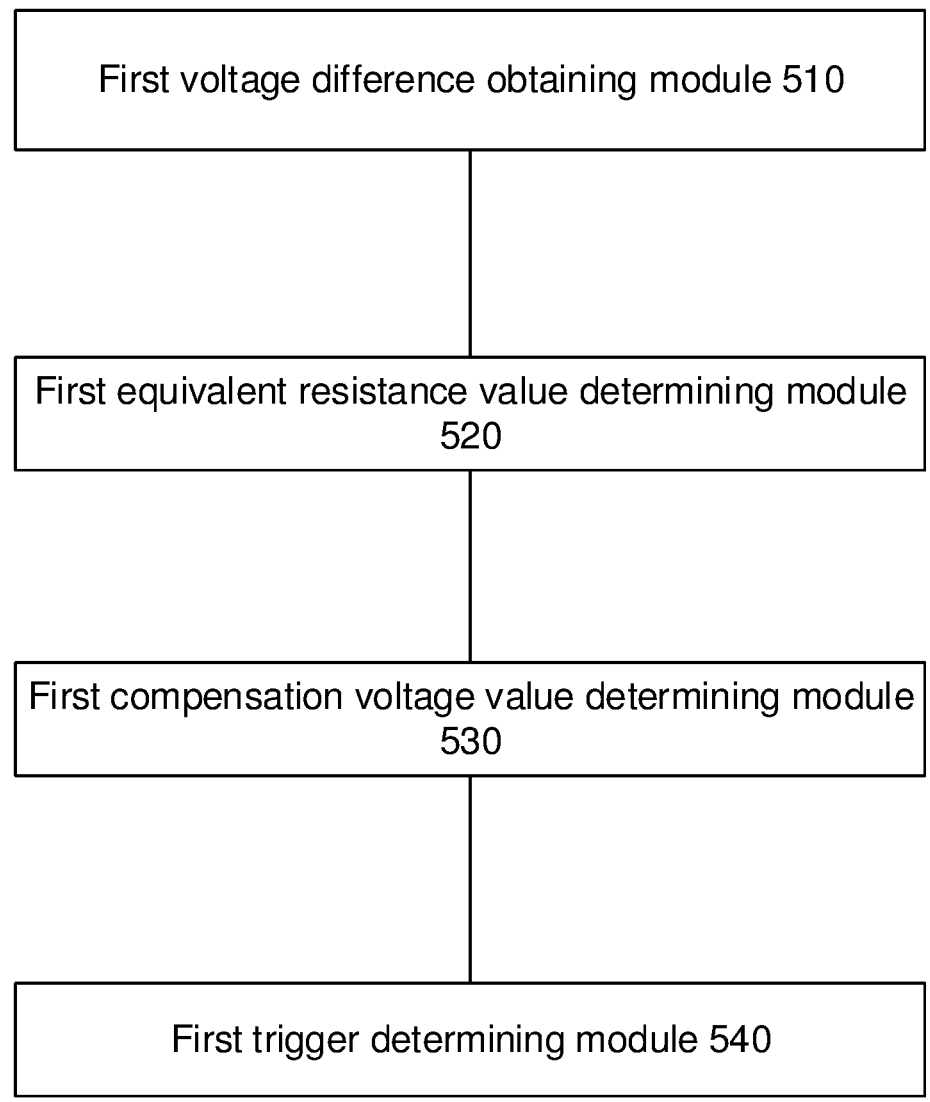
FIG. 5 is a schematic structural diagram of a device for controlling a touch screen according to an embodiment of the present disclosure.

Referring to FIG. 5, a schematic structural diagram of a device for controlling a touch screen according to an embodiment of the present disclosure is shown.

The device for controlling the touch screen may include: a first voltage difference obtaining module 510 configured to obtain a first voltage difference between a first voltage output terminal and a second voltage output terminal of the bridge corresponding to a first driving voltage when the first driving voltage is applied to a voltage input terminal of the bridge; a first equivalent resistance value determining module 520 configured to determine a first equivalent resistance value of the bridge corresponding to the first driving voltage at a current temperature according to the first driving voltage and a preset equation; a first compensation voltage value determining module 530 configured to determine a first compensation voltage value corresponding to the current temperature according to the first equivalent resistance value, the first voltage difference, and a preset formula; and a first trigger determining module 540 configured to determine whether to trigger a touch unit corresponding to the bridge according to the first voltage difference and the first compensation voltage value.

In the embodiment of the present disclosure, the touch screen includes a plurality of touch units, and each touch unit includes a bridge formed by a plurality of touch sub-units connected in series. A first driving voltage is applied to a voltage input terminal of the bridge, and a first voltage difference between a first voltage output terminal and a second voltage output terminal of the bridge corresponding to the first driving voltage is obtained; a first equivalent resistance value of the bridge corresponding to the first driving voltage at a current temperature is determined according to the first driving voltage and a preset equation; a first compensation voltage value corresponding to the current temperature is determined according to the first equivalent resistance value, the first voltage difference, and a preset formula; it is determined whether to trigger a touch unit corresponding to the bridge according to the first voltage difference and the first compensation voltage value. The first voltage difference can be compensated according to the current temperature, and whether to trigger the touch unit corresponding to the bridge is determined according to the compensated voltage difference. Therefore, the effect of temperature change on the judgment result of the control chip of the touch screen can be eliminated, and the occurrence of false reporting points of the touch screen can be effectively avoided, which greatly improves the user experience using the touch screen.

A device for controlling a touch screen provided by another embodiment of the present disclosure is described in detail.

The touch screen of the embodiment of the present disclosure may include a plurality of touch units, and each touch unit includes a bridge formed by a plurality of touch sub-units connected in series.

Figure 6:
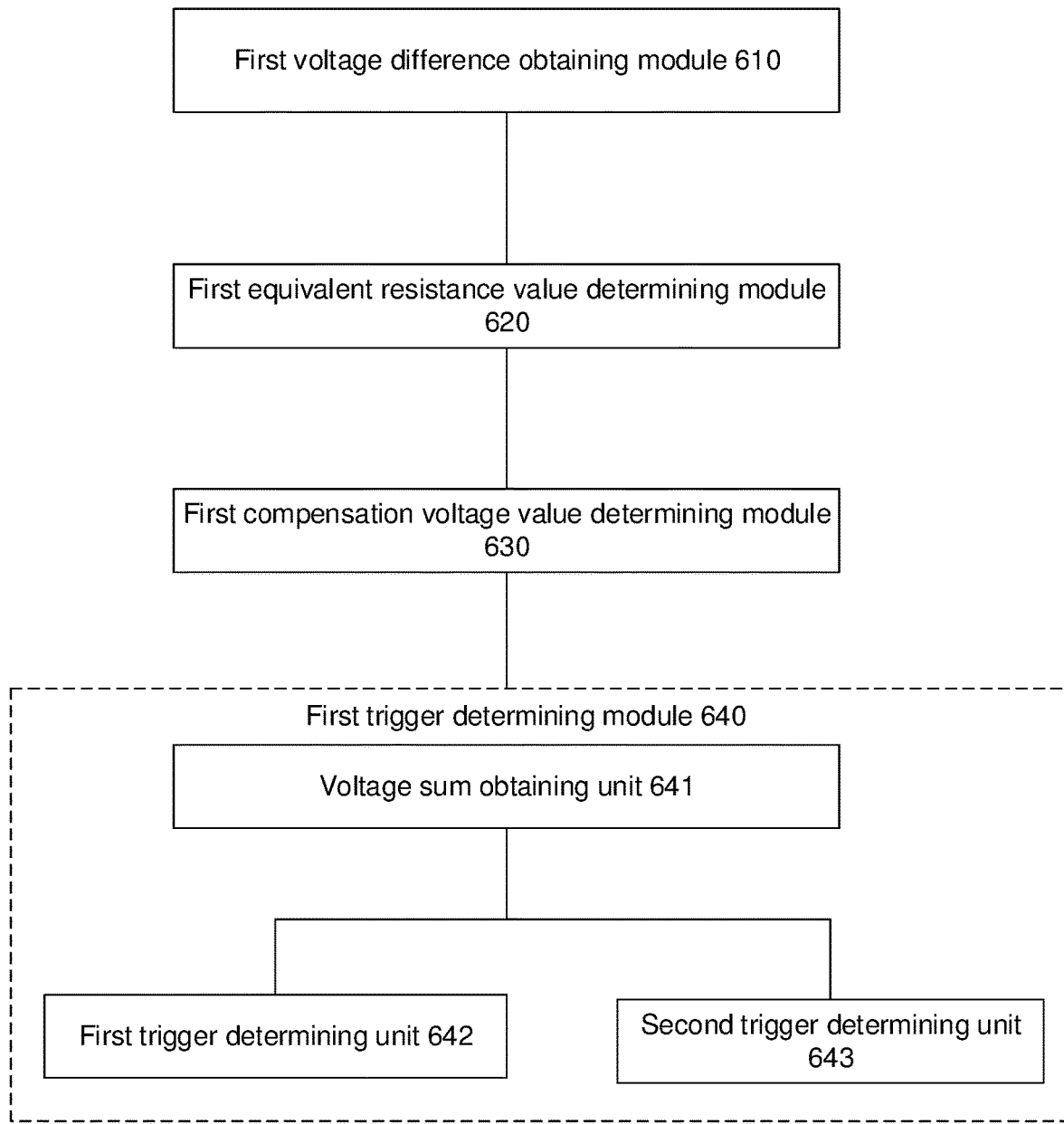
FIG. 6 is a schematic structural diagram of a device for controlling a touch screen according to another embodiment of the present disclosure.

Referring to FIG. 6, a schematic structural diagram of a device for controlling a touch screen according to another embodiment of the present disclosure is shown.

The device for controlling the touch screen may include: a first voltage difference obtaining module 610, a first equivalent resistance value determining module 620, a first compensation voltage value determining module 630, and a first trigger determining module 640.

The first voltage difference obtaining module 610 is configured to obtain a first voltage difference between a first voltage output terminal and a second voltage output terminal of the bridge corresponding to a first driving voltage when the first driving voltage is applied to a voltage input terminal of the bridge.

The first equivalent resistance value determining module 620 is configured to determine a first equivalent resistance value of the bridge corresponding to the first driving voltage at a current temperature according to the first driving voltage and a preset equation.

Optionally, the preset equation may include a first equality and a second equality. A left side of the first equality is related to a ratio formed by the first driving voltage, a second driving voltage, the first equivalent resistance value, and a second equivalent resistance value of the bridge corresponding to the second driving voltage at the current temperature, and a right side of the first equality is related to a ratio formed by the first driving voltage, the second driving voltage, a first constant, and a second constant. A left side of the second equality is related to a ratio formed by the first driving voltage, the first constant, and the first equivalent resistance value, and a right side of the second equality is related to a ratio formed by the second driving voltage, the second constant, and the second equivalent resistance value. The first constant may be a third equivalent resistance value of the bridge corresponding to the first driving voltage at the reference temperature, and the second constant may be a fourth equivalent resistance value of the bridge corresponding to the second driving voltage at the reference temperature.

Optionally, when the third equivalent resistance value is a first known constant and the fourth equivalent resistance value is a second known constant, the preset equation may be the following equations:

$$(V2*M2-V1*M1)/(V1*M1)=(V2*M4-V1*M3)/(V1*M3); \text{ and}$$

$$(V1*M3-V1*M1)/(V1*M1)=(V2*M4-V2*M2)/(V2*M2)$$

where V1 is the first driving voltage, V2 is the second driving voltage, M1 is the first equivalent resistance value, M2 is the second equivalent resistance value, M3 is the first constant, and M4 is the second constant.

The first compensation voltage value determining module 630 is configured to determine a first compensation voltage value corresponding to the current temperature according to the first equivalent resistance value, the first voltage difference, and a preset formula;

Optionally, the preset formula may be related to the first compensation voltage value, the first voltage difference, and a product of the first equivalent resistance value and the first voltage difference.

Optionally, the preset formula may be:

$$\lambda = M1*\Delta V1 - \Delta V1$$

where $\lambda$ is the first compensation voltage value, M1 is the first equivalent resistance value, $\Delta V1$ is the first voltage difference, and $M1*\Delta V1$ is the offset of the voltage difference of the bridge at the current temperature.

The first trigger determining module 640 configured to determine whether to trigger a touch unit corresponding to the bridge according to the first voltage difference and the first compensation voltage value.

Optionally, the first trigger determining module 640 may include: a voltage sum obtaining unit 641 configured to obtain a voltage sum of the first voltage difference and the first compensation voltage value; a first trigger determining unit 642 configured to not to trigger the touch unit corresponding to the bridge in response to that the voltage sum is less than a preset voltage value; and a second trigger determining unit 643 configured to determine to trigger the touch unit corresponding to the bridge in response to that the voltage sum is greater than or equal to the preset voltage value.

In the embodiment of the present disclosure, the touch screen includes a plurality of touch units, and each touch unit includes a bridge (for example, a Wheatstone bridge) formed by a plurality of touch sub-units connected in series. A first driving voltage is applied to a voltage input terminal of the bridge, and a first voltage difference between a first voltage output terminal and a second voltage output terminal of the bridge corresponding to the first driving voltage is obtained; a first equivalent resistance value of the bridge corresponding to the first driving voltage at a current temperature is determined according to the first driving voltage and a preset equation; a first compensation voltage value corresponding to the current temperature is determined according to the first equivalent resistance value, the first voltage difference, and a preset formula; a voltage sum of the first voltage difference and the first compensation voltage value is obtained; if the voltage sum is less than the preset voltage value, it is determined not to trigger the touch unit corresponding to the bridge; if the voltage sum is greater than or equal to the preset voltage value, it is determined to trigger the touch unit corresponding to the bridge. The first voltage difference can be compensated according to the current temperature, and whether to trigger the touch unit corresponding to the bridge is determined according to the compensated voltage difference. Therefore, the effect of temperature change on the judgment result of the control chip of the touch screen can be eliminated, and the occurrence of false reporting points of the touch screen can be effectively avoided, which greatly improves the user experience using the touch screen.

As for the device embodiment, since it is basically similar to the method embodiment, the description is relatively simple. For the related parts, refer to the description of the method embodiment.

Preferably, an embodiment of the present disclosure further provides an electronic device having a touch screen. The electronic device includes a processor, a memory, and a computer program stored in the memory and executable on the processor. The computer program, when executed by a processor, implements the embodiments of the processes of the above-mentioned touch screen control method, and the same technical effects can be achieved. To avoid repetition, details are not described herein again.

An embodiment of the present disclosure also provides a computer-readable storage medium, and a computer program is stored on the computer-readable storage medium. The computer program, when executed by a processor, implements the embodiments of the processes of the above-mentioned touch screen control method, and the same technical effects can be achieved. To avoid repetition, details are not described herein again. The computer-readable storage medium is, for example, a read-only memory (ROM), a random access memory (RAM), a magnetic disk or an optical disk.

It should be noted that, in this article, the terms "include", "including" or any other variants thereof are intended to cover non-exclusive inclusion, so that a process, method, article or device including a series of elements includes not only those elements, and also includes other elements not explicitly listed, or elements inherent to such a process, method, article, or device.

Without more restrictions, an element limited by the sentence "including a . . . " does not exclude that there are other identical elements in the process, method, article, or device that includes the element.

Through the description of the above embodiments, those skilled in the art can clearly understand that the methods in the above embodiments can be implemented by means of software plus a necessary universal hardware platform, and of course, also by hardware, but in many cases the former is a better implementation. Based on such an understanding, the technical solution of the present disclosure in essence or a part that contributes to the existing technology may be embodied in the form of a software product. The computer software product is stored in a storage medium (such as ROM/RAM, magnetic disk, CD-ROM), and includes several instructions to enable a terminal (which may be a mobile phone, computer, server, air conditioner, or network device, etc.) to execute the methods described in the various embodiments of the present disclosure.

The embodiments of the present disclosure have been described above with reference to the accompanying drawings, but the present disclosure is not limited to the above specific embodiments. The specific embodiments described above are merely illustrative and not restrictive. Persons of ordinary skill in the art in the art may, under the inspiration of the present disclosure, make many forms without departing from the spirit of the present disclosure and the scope of protection of the claims, which all fall within the protection of the present disclosure.

Persons of ordinary skill in the art may be aware that the units and algorithm steps of each example described in conjunction with the embodiments disclosed herein may be implemented by electronic hardware, computer software, or a combination thereof. Whether these functions are implemented by hardware or software depends on the specific application and design constraints of the technical solutions. A person skilled in the art may use different methods to implement the described functions for each particular application, but such implementation should not be considered as beyond the scope of the present disclosure.

A person skilled in the art may clearly understand that, for the convenience and brevity of the description, the specific working process of the system, the apparatus and the unit described above may refer to the corresponding process in the foregoing method embodiment, and details are not described herein again.

In the several embodiments provided in the present application, it should be understood that the disclosed device and method may be implemented in other manners. For example, the device embodiments described above are merely exemplary. For example, the unit division is merely logical function division and may be otherwise divided in actual implementation. For example, multiple units or components may be combined or may be integrated into another system, or some features may be ignored or not executed. In addition, the mutual coupling or direct coupling or communication connection shown or discussed may be indirect coupling or communication connection through some interfaces, devices or units, and may be electrical, mechanical or other forms of connection.

The units described as separate components may or may not be physically separated. The components displayed as units may or may not be physical units, that is, may be located in one place or may also be distributed to multiple network units. Some or all of the units may be selected according to actual needs to achieve the objectives of the solutions in the embodiments of the present disclosure.

In addition, each functional unit in each embodiment of the present disclosure may be integrated in one processing unit, or each unit may exist alone physically, or two or more units may be integrated in one unit.

When the function is implemented in the form of software functional unit and is sold or used as an independent product, the function may be stored in a computer-readable storage medium.

Based on such understanding, the technical solution of the present disclosure essentially, or the part contributing to the prior art, or part of the technical solution may be embodied in the form of a software product. The computer software product is stored in a storage medium and includes several instructions for causing a computer device (which may be a personal computer, a server, or a network device, etc.) to perform all or part of the steps of the methods described in the embodiments of the present disclosure. The foregoing storage medium includes various medium capable of storing program code such as a USB disk, a removable hard disk, a ROM, a RAM, a magnetic disk, or an optical disk.

The above is only a specific implementation of the present disclosure, but the scope of protection of the present disclosure is not limited to this. Any person skilled in the art can easily think of changes or replacements within the technical scope disclosed in the present disclosure. These changes or replacements should be covered by the protection scope of the present disclosure. Therefore, the protection scope of the present disclosure shall be subject to the protection scope of the claims.

We claim:

1. A method for controlling a touch screen, wherein the touch screen comprises a plurality of touch units, and each of the touch units comprises a bridge formed by a plurality of touch sub-units connected in series, and the method for controlling the touch screen comprises:

applying a first driving voltage to a voltage input terminal of the bridge, and obtaining a first voltage difference between a first voltage output terminal and a second voltage output terminal of the bridge corresponding to the first driving voltage;

determining a first equivalent resistance value of the bridge corresponding to the first driving voltage at a current temperature according to the first driving voltage and a preset equation;

determining a first compensation voltage value corresponding to the current temperature according to the first equivalent resistance value, the first voltage difference, and a preset formula;

determining whether to trigger a touch unit corresponding to the bridge according to the first voltage difference and the first compensation voltage value, wherein the preset equation is the following equations:

$$(V2*M2-V1*M1)/(V1*M1)=(V2*M4-V1*M3)/(V1*M3); \text{ and}$$

$$(V1*M3-V1*M1)(V1*M1)=(V2*M4-V2*M2)/(V2*M2)$$

wherein V1 is the first driving voltage, V2 is the second driving voltage, M1 is the first equivalent resistance value, M2 is the second equivalent resistance value, M3 is a third equivalent resistance value of the bridge corresponding to the first driving voltage at a reference temperature, and M4 is a fourth equivalent resistance value of the bridge corresponding to the second driving voltage at the reference temperature.

2. The method according to claim 1, wherein the determining whether to trigger a touch unit corresponding to the bridge according to the first voltage difference and the first compensation voltage value comprises:

obtaining a voltage sum of the first voltage difference and the first compensation voltage value;
determining not to trigger the touch unit corresponding to the bridge if the voltage sum is less than a preset voltage value; and
determining to trigger the touch unit corresponding to the bridge if the voltage sum is greater than or equal to the preset voltage value.

3. A method for controlling a touch screen, wherein the touch screen comprises a plurality of touch units, and each of the touch units comprises a bridge formed by a plurality of touch sub-units connected in series, and the method for controlling the touch screen comprises:

applying a first driving voltage to a voltage input terminal of the bridge, and obtaining a first voltage difference between a first voltage output terminal and a second voltage output terminal of the bridge corresponding to the first driving voltage;
determining a first equivalent resistance value of the bridge corresponding to the first driving voltage at a current temperature according to the first driving voltage and a preset equation;
determining a first compensation voltage value corresponding to the current temperature according to the first equivalent resistance value, the first voltage difference, and a preset formula;
determining whether to trigger a touch unit corresponding to the bridge according to the first voltage difference and the first compensation voltage value,
wherein the preset formula is:

$$\lambda = M1 * \Delta V1 - \Delta V1$$

wherein $\lambda$ is the first compensation voltage value, M1 is the first equivalent resistance value, and $\Delta V1$ is the first voltage difference.

4. The method according to claim 3, wherein the determining whether to trigger a touch unit corresponding to the bridge according to the first voltage difference and the first compensation voltage value comprises:

obtaining a voltage sum of the first voltage difference and the first compensation voltage value;
determining not to trigger the touch unit corresponding to the bridge if the voltage sum is less than a preset voltage value;
determining to trigger the touch unit corresponding to the bridge if the voltage sum is greater than or equal to the preset voltage value.

5. A device for controlling a touch screen, wherein the touch screen comprises a plurality of touch units, and each of the touch units comprises a bridge formed by a plurality of touch sub-units connected in series, and the device for controlling the touch screen comprises:

a first voltage difference obtaining module configured to obtain a first voltage difference between a first voltage output terminal and a second voltage output terminal of the bridge corresponding to a first driving voltage when the first driving voltage is applied to to a voltage input terminal of the bridge;
a first equivalent resistance value determining module configured to determine a first equivalent resistance value of the bridge corresponding to the first driving voltage at a current temperature according to the first driving voltage and a preset equation;
a first compensation voltage value determining module configured to determine a first compensation voltage value corresponding to the current temperature according to the first equivalent resistance value, the first voltage difference, and a preset formula;
a first trigger determining module, configured to determine whether to trigger a touch unit corresponding to the bridge according to the first voltage difference and the first compensation voltage value,
wherein the preset equation is the following equation:

$$(V2*M2 - V1*M1)/(V1*M1) = (V2*M4 - V1*M3)/(V1*M3);$$

$$(V1*M3 - V1*M1)/(V1*M1) = (V2*M4 - V2*M2)/(V2*M2)$$

wherein V1 is the first driving voltage, V2 is the second driving voltage, M1 is the first equivalent resistance value, M2 is the second equivalent resistance value, M3 is a third equivalent resistance value of the bridge corresponding to the first driving voltage at a reference temperature, and M4 is a fourth equivalent resistance value of the bridge corresponding to the second driving voltage at the reference temperature.

6. The device according to claim 5, wherein the first trigger determining module comprises:

a voltage sum obtaining unit configured to obtain a voltage sum of the first voltage difference and the first compensation voltage value;
a first trigger determining unit configured to determine not to trigger the touch unit corresponding to the bridge in response to that the voltage sum is less than a preset voltage value;
a second trigger determining unit configured to determine to trigger the touch unit corresponding to the bridge in response to that the voltage sum is greater than or equal to the preset voltage value.

7. An electronic device comprising:

a touch screen, comprising a plurality of touch units, and each of the touch units comprises a bridge formed by a plurality of touch sub-units connected in series,
a memory,
a processor, and
a computer program stored on the memory and operable on the processor, wherein the computer program, when executed by the processor, causes the electronic device to control the touch screen by:
applying a first driving voltage to a voltage input terminal of the bridge, and obtaining a first voltage difference between a first voltage output terminal and a second voltage output terminal of the bridge corresponding to the first driving voltage;
determining a first equivalent resistance value of the bridge corresponding to the first driving voltage at a current temperature according to the first driving voltage and a preset equation;
determining a first compensation voltage value corresponding to the current temperature according to the first equivalent resistance value, the first voltage difference, and a preset formula;
determining whether to trigger a touch unit corresponding to the bridge according to the first voltage difference and the first compensation voltage value,
wherein the preset equation is the following equations:

$$(V2*M2 - V1*M1)/(V1*M1) = (V2*M4 - V1*M3)/(V1*M3); \text{ and}$$

$$(V1*M3-V1*M1)/(V1*M1)=(V2*M4-V2*M2)/(V2*M2)$$

wherein V1 is the first driving voltage, V2 is the second driving voltage, M1 is the first equivalent resistance value, M2 is the second equivalent resistance value, M3 is a third equivalent resistance value of the bridge corresponding to the first driving voltage at a reference temperature, and M4 is a fourth equivalent resistance value of the bridge corresponding to the second driving voltage at the reference temperature.

8. The electronic device according to claim 7, wherein the determining whether to trigger a touch unit corresponding to the bridge according to the first voltage difference and the first compensation voltage value comprises:
   obtaining a voltage sum of the first voltage difference and the first compensation voltage value;
   determining not to trigger the touch unit corresponding to the bridge if the voltage sum is less than a preset voltage value;
   determining to trigger the touch unit corresponding to the bridge if the voltage sum is greater than or equal to the preset voltage value.

9. An electronic device comprising:
   a touch screen, comprising a plurality of touch units, and each of the touch units comprises a bridge formed by a plurality of touch sub-units connected in series,
   a memory,
   a processor, and
   a computer program stored on the memory and operable on the processor, wherein the computer program, when executed by the processor, causes the electronic device to control the touch screen by:
   applying a first driving voltage to a voltage input terminal of the bridge, and obtaining a first voltage difference between a first voltage output terminal and a second voltage output terminal of the bridge corresponding to the first driving voltage;
   determining a first equivalent resistance value of the bridge corresponding to the first driving voltage at a current temperature according to the first driving voltage and a preset equation;
   determining a first compensation voltage value corresponding to the current temperature according to the first equivalent resistance value, the first voltage difference, and a preset formula;
   determining whether to trigger a touch unit corresponding to the bridge according to the first voltage difference and the first compensation voltage value,
   wherein the preset formula is:

$$\lambda = M1 * \Delta V1 - \Delta V1$$

wherein $\lambda$ is the first compensation voltage value, M1 is the first equivalent resistance value, and $\Delta V1$ is the first voltage difference.

10. The electronic device according to claim 9, wherein the determining whether to trigger a touch unit corresponding to the bridge according to the first voltage difference and the first compensation voltage value comprises:
   obtaining a voltage sum of the first voltage difference and the first compensation voltage value;
   determining not to trigger the touch unit corresponding to the bridge if the voltage sum is less than a preset voltage value;
   determining to trigger the touch unit corresponding to the bridge if the voltage sum is greater than or equal to the preset voltage value.

* * * * *